United States Patent
Hotaling

Patent Number: 5,493,866
Date of Patent: Feb. 27, 1996

[54] PROCESS FOR CREATING TEXTURED AND TRANSPARENT ICE PRODUCTS

[76] Inventor: William Hotaling, P.O. Box 3066, Saratoga Springs, N.Y. 12866

[21] Appl. No.: 367,012

[22] Filed: Dec. 30, 1994

Related U.S. Application Data

[63] Continuation-in-part of Ser. No. 89,586, Jul. 12, 1993, abandoned.

[51] Int. Cl.$^6$ .................................................. F25C 1/22
[52] U.S. Cl. .................................................. 62/66; 62/356
[58] Field of Search .................................. 62/66, 340, 356

[56] References Cited

U.S. PATENT DOCUMENTS

| | | | |
|---|---|---|---|
| 1,480,255 | 1/1924 | Friedl | 62/66 |
| 1,939,109 | 12/1933 | Davidson | 62/356 X |
| 1,943,466 | 1/1934 | West et al. | 62/66 |
| 2,282,544 | 5/1942 | Rosberg | 62/356 X |
| 3,321,932 | 5/1967 | Orphey, Jr. | 62/340 |
| 3,411,463 | 11/1968 | Moseres | 62/356 X |
| 4,601,174 | 7/1986 | Wilson | 62/66 |
| 4,752,310 | 6/1988 | Maier-Laxhuber et al. | 62/66 X |

*Primary Examiner*—William E. Tapolcai
*Attorney, Agent, or Firm*—Heslin & Rothenberg

[57] ABSTRACT

The invention relates to a method of making ice products having a biting texture from an aqueous solution of non-ionic species in a container having a low thermal conductivity and a surface to volume ratio of at least 3.3.

20 Claims, 2 Drawing Sheets

PROCESS FOR CREATING TEXTURED AND TRANSPARENT ICE PRODUCTS

CROSS-REFERENCE TO RELATED APPLICATIONS

The following is a continuation-in-part of U.S. patent application No. 08/089,586, filed Jul. 12, 1993, in the name of William E. Hotaling, now abandoned.

1. Field of the Invention

The present invention generally relates to the production of ice products. More specifically, the present invention relates to a method for creating textured and transparent edible ice products.

2. Background of the Invention

There presently exist a great number of shelf stable frozen ice products which are available on both a retail and commercial basis. Frozen grocery ice products such as italian ices, freezer pops and frozen fruit juices have long been a popular consumer product. These frozen ice products have been sold in numerous forms such as on sticks, in plastic tubes and in wax coated paper containers. Recently, the sales of such ice products have increased considerably due in part to the publics health concerns regarding calories, cholesterol, fat and chemical-additives. These health concerns pose a serious problem for many frozen products which are often high in fat and cholesterol, an example being ice cream. However, other frozen products which are low in calories and fat are often high in chemical additives.

In addition, current manufacturing processes of ice products have a variety of additives which health conscious consumers seek to avoid. For example, in order to obtain an appropriate biting texture to the ice, texturing agents such as a combination of gums are added to the formulas of the frozen ice products, thereby causing the ice products to suffer drawbacks typically associated with other frozen food items.

It is well known that when selling consumer goods an important aspect of the product is its appearance. This is particularly true with grocery items. In addition to the visual appearance the texture and consistency must likewise be appealing to the consumer. In this regard, ice products having a biting texture are greatly preferred. A "biting texture" refers to an ice product having a texture and consistency that is not so hard that it can not be readily broken by mastication and does not have a smooth surface. An "all natural" ice product, which refers to an ice product that is shelf stable while avoiding the use of preservatives and other chemical additives, is likewise preferred by many health conscious consumers.

Currently the production of transparent ice products has been substantially dealt with by controlling the purity of the water. For example, clear ice is produced at canned iced plants utilizing steel containers filled with water placed in a brine tank. Air is then introduced into the can at a pressure sufficient to agitate the water therein. When the ice block is approximately ¾ frozen dissolved solids in the water are concentrated in the remaining non-frozen aqueous solution and this aqueous solution is then pumped out by a core sucker and fresh distilled water is then pumped back into the ice core whereupon freezing of the ice block is completed.

Similarly, many ice machines pump water over a freezing surface, such as an evaporator, causing the pure water to freeze upon the evaporator and allowing the water containing the minerals or other impurities to get flushed from the system. Another alternative as described in U.S. Pat. Nos. 4,979,370 and 5,157,929 relate to removing dissolved gases within the distilled water by bubbling nitrogen through the water and applying a vacuum over the water surface. Thereafter, the lack of visible prism formations in the ice is dependent upon the specific temperature at which the ice is frozen. Thus, prior methods of creating frozen ice products have largely attempted to create transparent ice products by removing impurities within the water.

Today, most manufacturers of novelty ice products use a Vitaline® machine, of Crepco, Inc., to mass produce their ice products. Here, vertically positioned metallic molds are filled with a liquid and then moved through a cold bath, such as glycol, at temperatures at approximately −40° F. However, utilization of the Vitaline® machine in this manner produces an ice product having numerous compact ice prisms thereby making the ice substantially opaque. Such a process further suffers from creating hard unmasticatible ice products unless texturing agents are inserted within the ice formula.

In addition, in order to make the product healthier and more appealing to the consumer it may be preferable to include fruit within the frozen novelty ice products. However, in this regard the techniques described above suffer from further significant drawbacks. Utilizing the Vitaline® machine as described above will cause the ice product to freeze in such a manner that ice prisms form and exert significant pressure on the fruit which causes destruction of the individual cells and/or fiber structure comprising the fruit. This results in a frozen ice product in which the fruit is either extremely hard in the frozen state locking natural shape and texture when thawed. Previous solutions to this problem have suggested that the best process for maintaining the texture of the fruit would be to use an individual flash freezing process which involves spraying of the fruit with liquid nitrogen in order to instantaneously freeze the produce. However, such processes are not concerned with forming an ice-product with a biting texture nor one with an appealing appearance in the frozen state since these processes are concerned only with the nature of the fruit once thawed, ignoring the concerns relevant to products intended to be marketed and consumed in the frozen state.

Therefore, there exists a need for a method of making textured ice products from aqueous solutions without the use of unnatural additives. There likewise exists a need for the production of textured ice products which may be mass produced, as well as manufactured inexpensively, and which still yield an appealing product. There similarly exists a need for a method of producing an ice product in which the resulting product is aesthetically appealing and substantially transparent. There further exists a need for a method of making a frozen ice product in which fruit or vegetables contained therein maintain their natural shape and texture and yet maintain the desired biting texture of the ice-product itself.

SUMMARY OF THE INVENTION

The aforesaid needs are satisfied and the shortcomings of the prior art overcome by a method of making textured ice products comprising:

supplying a non-ionic aqueous solution containing at least 10% by weight of solute;

placing said aqueous solution in a container having a thermal conductivity less than 1, the interior of said container being less than 2 about 5 cm in at least one dimension, and the ratio of volume to surface area of said container being at least 3.3;

subjecting the exterior of said container housing said aqueous solution to temperatures between 28° F. and −40° F. until said aqueous solution freezes, thereby forming an ice product with a biting texture.

The method may be further characterized wherein the material comprising said non-thermal conductive container is at least 0.5 mm thick and comprises a material selected from the group of plastic and rubber. The interior of the container may be about 2.5 cm in at least one dimension. The method described above further include placing at least one portion of a solid insoluble organic material within the container prior to freezing said aqueous solution.

In a further aspect the invention relates to a method of making textured ice products, comprising:

supplying a non-ionic aqueous solution containing at least 10% by weight of solute;

placing said aqueous solution in a flexible container having a thermal conductivity of less than about 1, filling not more than about 80% of the total volume of the interior of said container with said aqueous solution;

sealing said container; then placing said container such that a ratio of surface area to volume of at least 3.3 is maintained, and subjecting said container to temperatures between 28° F. and −40° F. until said aqueous solution freezes thereby forming an ice product having a biting texture.

The method may be further characterized wherein the tubular container is under about 2 mm thick and has the dimensions 7" L×2.5" W×2" H. The method may further comprise adding solid organic material within the container such that the combined volume occupied by the organic matter and the aqueous solution together occupy no more than about 80% of the volume within said container.

In a further aspect the invention may comprise a method of making a textured ice product comprising:

(a) providing a plurality of molds having a thermal conductivity of under 1;

(b) filling said molds with a non-ionic aqueous solution containing at least 10% by volume of solute;

(c) circulating said molds through a freezing material maintained at temperatures between 0° F. and −40° F., wherein said aqueous solution freezes;

(d) removing said frozen aqueous solution from within said mold;

repeating steps (a)–(d).

DESCRIPTION OF THE INVENTION

The first step in the present method is to prepare an aqueous solution comprising substantially of dissolved non-ionic molecular species in water. Examples of such aqueous solutions include fruit juices, whether from concentrate or fresh squeezed, alcoholic beverages, teas, coffees, and anyone of numerous sugar based liquids. Although it is important that the aqueous solution comprise mainly non-ionic molecular species dissolved within the water it is acceptable to have small levels of ionic species, such as those levels of metallic and halogen ions commonly found in drinking water. However, lower levels of such ionic species is preferred. In addition, to insure that the ice product does not contain unwanted or harmful contaminants it is preferred that the aqueous solution be made from distilled water. The concentration levels of the non-ionic species (solute) should be at least 10% by weight, and preferably about 10–25% by weight.

Figure 3:
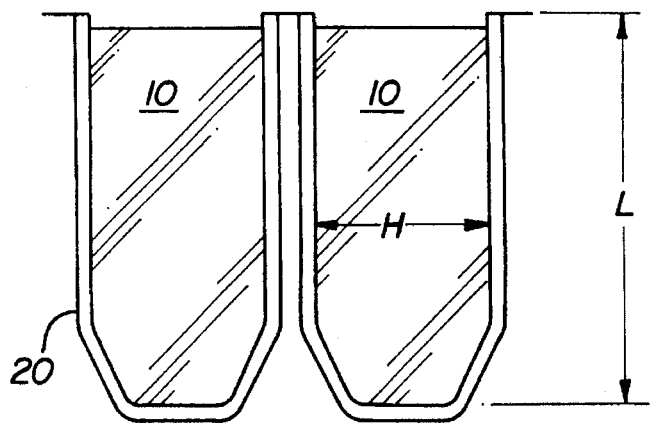
FIG. 3 is an open top container.

Thereafter the aqueous solution 10 may be placed in a container 20 which has very low thermal conductivity, as seen in FIG. 3. Preferably, the low thermal conductivity container comprises a material having a thermal conductivity (k) less than 1 calorie/($cm^2$)(second) and preferably about 0.003 cal./$cm^2$ sec. Examples of preferred materials include plastics and rubbers; e.g. polyethylene and natural rubber respectively.

The configuration and dimensions of the container should form an interior in which either the height, width or length of the interior volume does not exceed approximately 5 cm, thereby insuring a sufficiently high ratio of interior mold surface area (freezing surface area) to liquid volume. The ratio should be at least 3.3. More preferably, the interior volume of the container is limited in at least two dimensions to 5 cm or less. An example for a preferred container is one having a length of 7.5– 15.2 cm, a width of 2.5–7.5 cm and a height of 1.3– 3.8 cm, and more preferably a container a height of about 1.9 cm. The thickness of the material comprising the non-thermal conductive container may vary with regard to the temperatures used hereinbelow, the thermal conductivity of the material, and other factors well known to one skilled in the art. For example, when utilizing a solid inflexible polyethylene container the preferred thickness falls within the range of 0.5 mm to 2 mm thick and particularly 1.0 mm thickness.

The non-thermal conductive container may then be subjected to temperatures low enough to cause the aqueous solution to freeze and yet allow for the formation of a textured ice product. The non-thermal conductive container may be subjected to temperatures below 28° F. and above −40° F., preferably between 0° F. to −20° F. This may be accomplished by means well known in the art such as immersing the containers within a glycol or brine bath maintained at the desired temperature or by placing the thermal conductive containers within a similarly maintained refrigerating means.

Machines designed for the mass production of ice products, such as the Vitaline®, use thermally conductive materials such as aluminum and stainless steel molds of varying dimensions. However, the Vitaline® and other like machines may have existing molds replaced with those having low thermal conductivity specified above and the run time altered accordingly. The time necessary to freeze the aqueous solution will vary with regard to the thickness of the low thermal conductive container, the concentration of the dissolved species in the aqueous solution, temperature of the bath and other factors well known to one skilled in the art.

As indicated hereinabove prior methods of forming substantially transparent ice products have focused primarily on the purity of the water. However, it has been unexpectedly found that a substantially transparent or highly translucent ice product may be formed from solutions having significant concentrations of dissolved non-ionic molecular species by following the methods described herein. However, when utilizing an aqueous solution having a dissolved non-ionic molecular species which significantly absorbs light within the visible spectrum the transparency of the resulting ice product will be difficult to observe. By selecting non-ionic molecular species which do not significantly absorb light within the visible spectrum the transparency of the resulting ice product may be enhanced. Examples of such aqueous solutions include, but are not limited to, those sugar based liquids such as fruit juices made from the following: apple, pear, white grape and peach.

Figure 1:
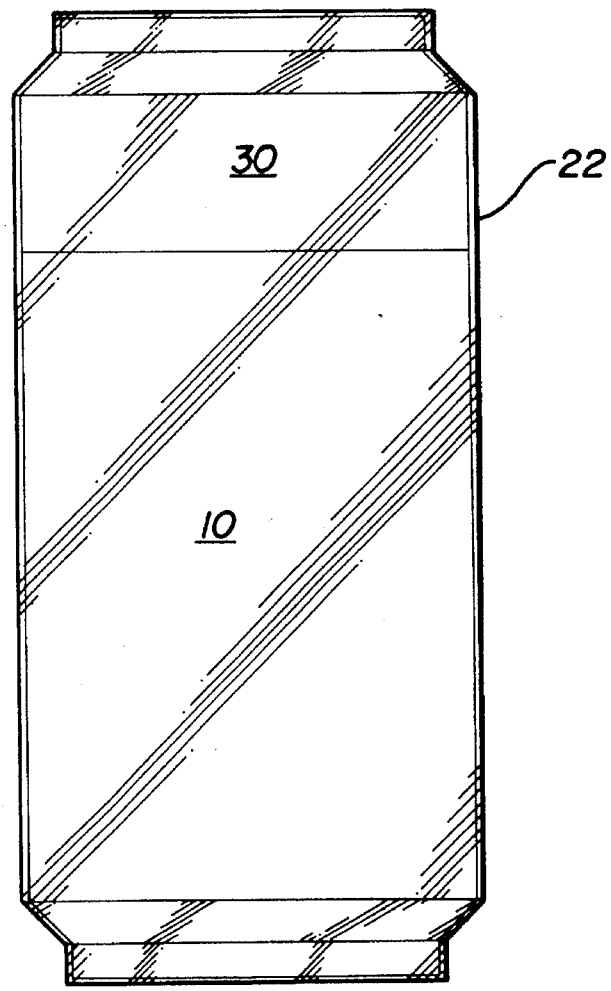
FIG. 1 is a sealed flexible plastic container in a vertical position with a 20 percent head space.
Figure 2:
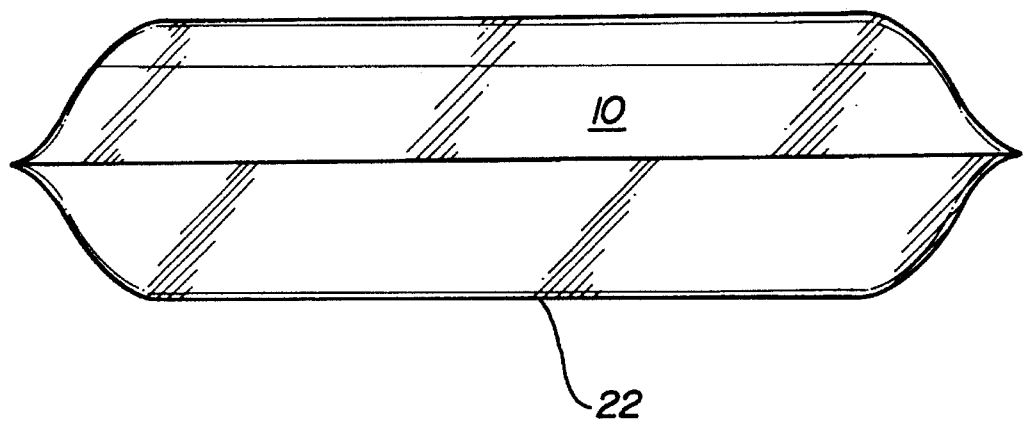
FIG. 2 is a sealed flexible plastic container in a horizontal position with the liquid content distributed in the head space of FIG. 1.

A common method of producing ice products today include utilization of sealed thin flexible plastic containers. The ice products may be formed within sealed pouches and shipped directly to the consumer in that form. Typically, these containers or pouches utilize a clear polyethylene plastic pouch having dimensions of about 10"L×1½"W×1"H and the aqueous solution is frozen within the pouch without any head space. However, due to the thinness of the container, when the aqueous solution completely fills the flexible container and frozen in either a vertical or horizontal position this may significantly lower the ratio of the container's inner-surface area to the liquid volume and/or create pressures upon the product within the sealed container during freezing. Freezing the aqueous solution in this manner results in a hard and opaque ice product. However, as seen in FIG. 1, by leaving adequate head space 30 and then positioning the flexible container 22 in a horizontal position (with the length of the pouch running parallel to the horizon, FIG. 2), thereby reducing the pressures exerted on the product and causing the solution to freeze in a more uniform manner. Freezing the aqueous solution in such a container in a horizontal position with the appropriate head space results in an ice product that is substantially transparent with a natural biting texture. Preferably, the flexible plastic container should have a head space of about 20% or more prior to sealing the container.

Figure 4B:
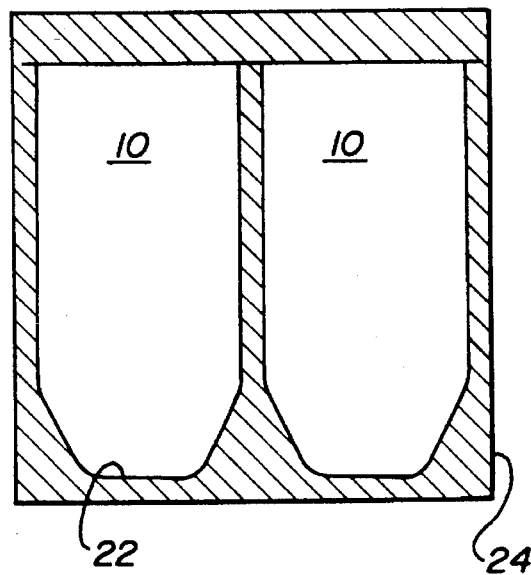
FIG. 4B is a frontal view of the figure in 4A.
Figure 4A:
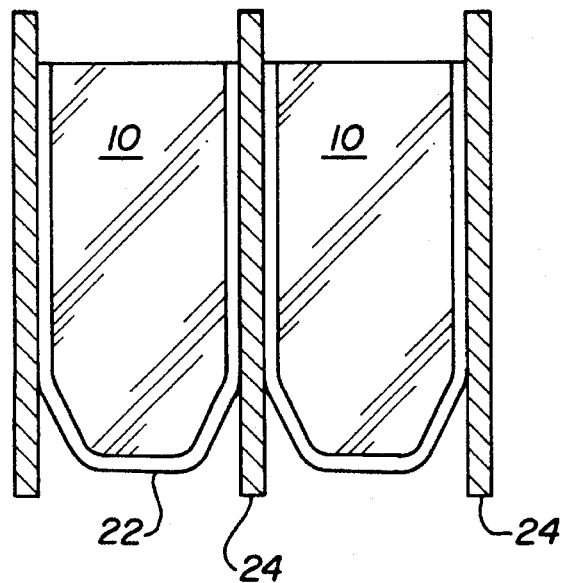
FIG. 4A is a side view of a sealed flexible plastic containers in a vertical position positioned between two sheets of material having a low thermal conductivity.

The problems associated with the ice products made within the sealed plastic pouches as described above may also be avoided by utilizing additional insulating material around the pouch when freezing the aqueous solution. For example, as shown in FIG. 5, 4a and 4b, sealed flexible pouch or container 22 may be placed between two 1 mm thick rigid plastic sheets 24 placed about 2 cm apart. This method creates transparent ice products with good biting texture from aqueous solutions. Placement of the additional plastic sheets may also be placed so as to insure that the surface area to volume ratio is maintained above the desired level of 3.3.

In addition, it has been found that the methods discussed above work equally well when insoluble organic matter, such as fruit and vegetables, is added to the aqueous solution prior to freezing the same. Although previous processes have generally experienced difficulty in obtaining frozen produce that maintains its natural texture and consistency, by freezing the aqueous solution and produce therein in accordance with the methods discussed above, the resulting ice product contains frozen fruit which is substantially similar in taste, look and feel to fresh fruit. Moreover, the fruit juices found within the fruit itself typically do not leak throughout the ice product when frozen in accordance with the methods described above.

EXAMPLE 1

A concentrate (65–75% sugar by weight) was diluted with 4–5 equivalents of distilled water to form an aqueous sugar based liquid. The aqueous sugar based liquid then had nitrogen gas bubbled into and through the liquid which was within an open plastic tray measuring 6"L×2"W×1"H. Thereafter, the liquid was frozen without a top in a chest type freezer at 0° F. When frozen the ice was transparent and had a partial biting texture.

EXAMPLE 2

An aqueous-sugar based liquid of example 1 had nitrogen bubbled through the liquid which was within a transparent flexible plastic pouch measuring 7"H× 2½"W×2"H. The plastic pouch was placed in a vertical position in a chest type freezer and frozen at 0° F. After freezing, the ice was transparent but it had to temper (exposure to room temperature for 10–15 minutes) before achieving a biting texture.

EXAMPLE 3

An aqueous solution of example 1 was placed within a flexible plastic pouch measuring 7"L×2½"W× 2"H. Dissolved gases within the aqueous solution were removed by applying a vacuum to the liquid filled pouch prior to freezing. The plastic tube was frozen at 0° F. in a chest type freezer in a vertical position. After freezing the ice was transparent although it was smooth and hard.

EXAMPLE 4

An aqueous sugar based liquid of example 1 was placed within a flexible plastic pouch measuring 7"L× 2½"W×2"H. The plastic tube was filled to capacity and then heat sealed and frozen in a vertical position in a chest type freezer at 0° F. When frozen the result was a hard and opaque ice product.

EXAMPLE 5

The same procedure as identified in Example 4 was used except the positioning of the tube during freezing was changed from a vertical to a horizontal position. This resulted in an ice product that was opaque and hard.

EXAMPLE 6

Two transparent flexible pouches measuring 7"L× 2½"W×2"H were partially filled with an aqueous sugar based liquid of example 1, leaving a head space of 20% of the total interior volume of the containers, which were then heat sealed. The first tube was placed in a horizontal position and the second tube placed in a placed in a vertical position in a chest type freezer. The flexible tube placed in a vertical position resulted in an ice product that was hard and opaque. However, the tube placed in a horizontal position resulted in an ice product that had excellent biting texture and transparency.

EXAMPLE 7

Aqueous sugar based solutions of example 1 was inserted into a thermal conductive molds, e.g. aluminum, nickel and stainless steel. The aqueous solutions were frozen at temperatures from 32° F. to −40° F. in a chest freezer and brine solution respectively and resulted in ice products which were hard and opaque.

EXAMPLE 8

A clear, flexible plastic pouch was filled to 80% of its total volume with an aqueous solution of a sugar based liquid of example 1 into which nitrogen was bubbled therethrough prior to heat sealing the container. The container was placed in the horizontal position while freezing in a ice chest freezer at 0° F. The resulting ice products exhibited a biting texture and a substantially transparent product.

EXAMPLE 9

Plastic molds of 1 mm thick plastic in the dimensions of 2"W×4"L×¾H having a total mold volume of 2½ oz. The molds are filled with an aqueous sugar based solution and are moved through a glycol solution at about −35° F. until frozen. The resulting ice products are substantially transparent and have an excellent biting texture.

EXAMPLE 10

As indicated in the table below each of the individual tests and their particular compositions resulted in an ice product that had a good biting texture, a substantially transparent appearance and fruit which retained its original consistency and texture. The respective formulas were frozen at 0° F. in a chest freezer. The formulations were inserted into a plastic mold container having a 2½ % oz. volume of dimensions 2"W×4"L×¾H. The thickness of the non-conductive plastic material was 1 mm.

| Test No. | Oz. of concentrated fruit juice formula | Oz. of fruit | After 1 hr. | Freezing time (in hrs.) |
| --- | --- | --- | --- | --- |
| A | ½ | 2 | about 75% frozen | 2 |
| B | 1 | 1½ | about 65%–75% frozen | 2 |
| C | 1½ | 1 | about 50% frozen | 3 |
| D | 2 | ½ | slush consistency | 5 |

EXAMPLE 11

Each of the individual tests described below resulted in an ice product that had good biting texture, substantially transparent appearance and in which the fruit retained its original consistency and texture. The respective formulas were frozen at −20° in a brine solution. The formulations were inserted into a plastic mold container having a 2½ oz. volume of dimensions 2 inches wide×4 inches long×¾ inches thick. The thickness of the non-conductive plastic material was 1 mm. The aqueous solution comprised of (65–75% sugar by weight concentrate diluted with 4–5 equivalents of water.

Tests A–D were checked every ten minutes. Tests A–C froze to a slush state after 20 minutes whereas in test D only the bottom portion of the mold had a slush consistency after 20 min.

| Test | Oz. of concentrated fruit juice | Oz. of fruit | After 1 hr. | Freezing time |
| --- | --- | --- | --- | --- |
| A | ½ | 2 | frozen | — |
| B | 1 | 1½ | frozen | — |
| C | 1½ | 1 | substantially frozen | 1 hr 10 min |
| D | 2 | 2 | substantially frozen | 1 hr 20 min |

EXAMPLE 12

A plastic pouch as described in example 6 was completely filled with from ¾ oz. to 3 oz. of the sugar based liquid of example 1 and fruit. The filled pouch was placed between two 1 mm thick plastic sheets placed about 2 cm apart. The aqueous solution was then frozen in a vertical position with and without sticks and the container heat sealed thereafter. The resulting ice products were transparent with a good biting texture.

While the present invention has been particularly shown and described with reference to preferred embodiments thereof, it will be understood to those skilled in the art that various changes in form and details may be made therein without departing from the spirit and the scope of the invention.

What is claimed is:

1. A method of making an ice product having a biting texture, comprising:

supplying a non-ionic aqueous solution containing at least 10% by weight of solute;

placing said aqueous solution in a container having a thermal conductivity less than 1, the interior of said container being less than about 5 cm in at least one dimension, and the ratio of volume to surface area of said container being at least 3.3;

subjecting the exterior of said container housing said aqueous solution to temperatures between 28° F. and −40° F. until said aqueous solution freezes, thereby forming an ice product with a biting texture.

2. The method of claim 1 wherein the material comprising said container is at least 0.5 mm thick.

3. The method of claim 1 wherein said non-thermal conductive container comprises a material selected from the group of plastic and rubber.

4. The method of claim 1 wherein said non-thermal conductive container comprises a material having a thermal conductivity of about 0.003.

5. The method of claim 1 wherein the interior of said container is less than 5 cm in two dimensions.

6. The method of claim 2 wherein the interior of said containers are about 2.5 cm in at least one dimension.

7. The method of claim 1 further comprising placing a solid insoluble organic material within said containers prior to freezing said aqueous solution.

8. The method of claim 1 wherein the interior of said container is about 1.9 cm in at least one dimension.

9. A method of making textured ice products, comprising:

supplying a non-ionic aqueous solution containing at least 10% by weight of solute;

placing said aqueous solution in a flexible container having a thermal conductivity of less than 1, filling not more than about 80% of the total volume of the interior of said container with said aqueous solution;

sealing said container; then placing said container in a horizontal position and subjecting said container to temperatures between 28° F. and −40° F. until said aqueous solution freezes thereby forming an ice product having a biting texture.

10. The method of claim 9 wherein the interior of said container is less than about 2.5 cm in at least one dimension.

11. The method of claim 9 wherein the interior of said container is 1.9 cm in at least one dimension.

12. The method of claim 8 further comprising adding a solid insoluble organic material to said container wherein the volume occupied by said solid and said aqueous solution together occupy no more than about 80% of the volume within said container.

13. A method of making textured ice products, comprising:

supplying a non-ionic aqueous solution containing at least 10% by weight of solute;

placing said aqueous solution in a flexible container having a thermal conductivity of less than 1, filling not more than about 80% of the total volume of the interior of said container with said aqueous solution;

sealing said container;

shielding said container with a insulating means having a thermal conductivity constant below 1;

subjecting said the shielded container to temperatures between 28° F. and −40° F. until said aqueous solution freezes thereby forming an ice product having a biting texture.

14. The method of claim 13 wherein the interior of said container is 1.9 cm in at least one dimension.

15. The method of claim 14 wherein said container comprises a material having a thermal conductivity constant below 1 and having thickness of at least 0.5 mm.

16. A method of making a textured ice product comprising:

(a) providing a plurality of molds having a thermal conductivity of under 1;

(b) filling said molds with a non-ionic aqueous solution containing at least 10% by weight of solute;

(c) circulating said molds through a freezing material maintained at temperatures between 0° F. and −40° F., wherein said aqueous solution freezes;

(d) removing said frozen aqueous solution from within said mold;

repeating steps (a)–(d).

17. The method of claim 15 wherein the material comprising said container is at least 0.5 mm thick.

18. The method of claim 16 wherein said non-thermal conductive container comprises a material selected from the group of plastic and rubber.

19. The method of claim 16 wherein said non-thermal conductive container comprises a material having a thermal conductivity of about 0.003.

20. The method of claim 16 further comprising placing a solid insoluble organic material within said containers prior to freezing said aqueous solution.

* * * * *